Jan. 6, 1925. 1,521,606
L. DINESEN
MILKING APPARATUS
Filed Dec. 19, 1921 2 Sheets-Sheet 1
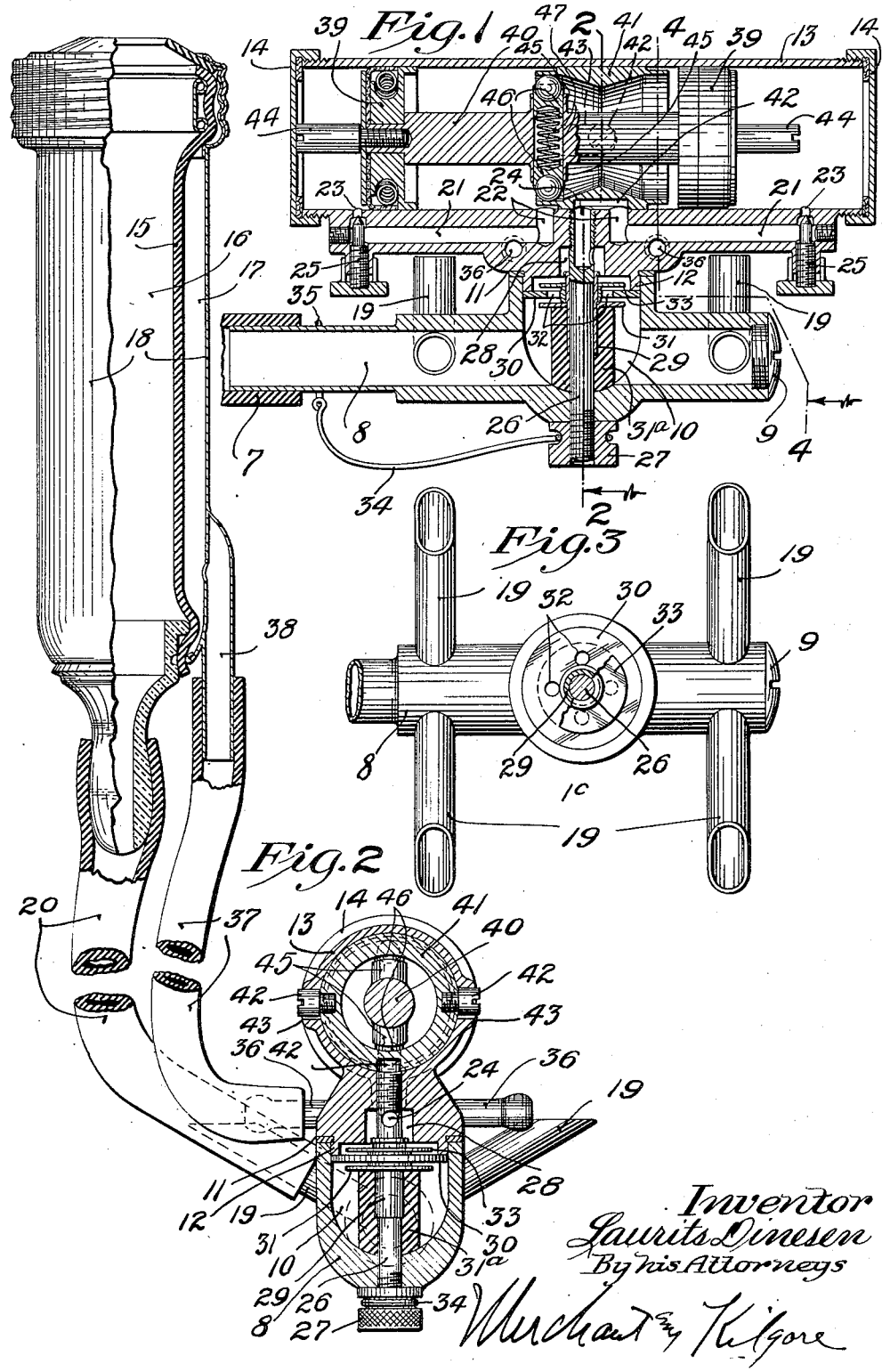

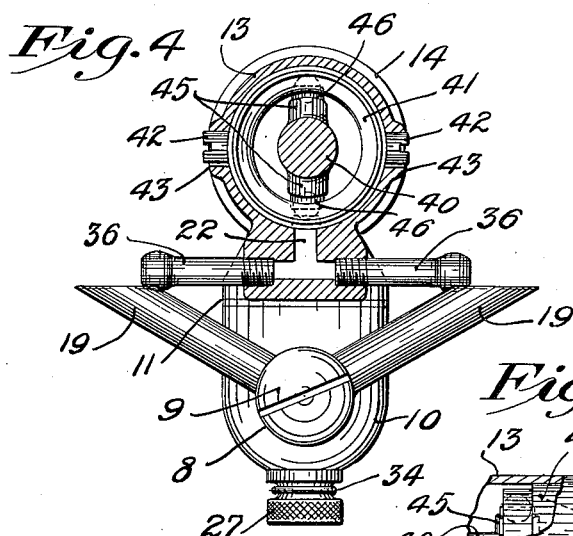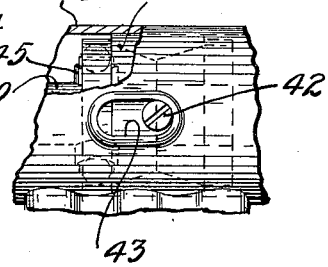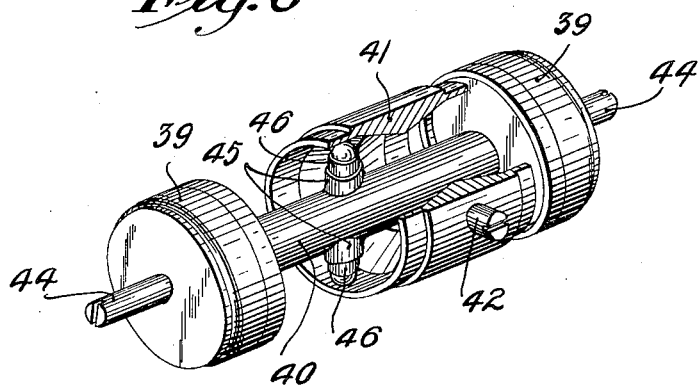

Patented Jan. 6, 1925.

1,521,606

UNITED STATES PATENT OFFICE.

LAURITS DINESEN, OF MINNEAPOLIS, MINNESOTA.

MILKING APPARATUS.

Application filed December 19, 1921. Serial No. 523,346.

*To all whom it may concern:*

Be it known that I, LAURITS DINESEN, a citizen of the United States, residing at Minneapolis, in the county of Hennepin and State of Minnesota, have invented certain new and useful Improvements in Milking Apparatus; and I do hereby declare the following to be a full, clear, and exact description of the invention, such as will enable others skilled in the art to which it appertains to make and use the same.

My invention relates to milking machines or apparatus and, generally stated, consists of the novel devices and combinations of devices hereinafter described and defined in the claims. The invention is directed chiefly to the improvement of the pulsator mechanism, but involves certain other important features, as will hereinafter more fully appear.

Particularly, the present invention is designed as an improvement on the pulsator and associated parts of the milking apparatus disclosed and claimed in my pending application Serial Number 287,256, filed of date April 3, 1919, and in which apparatus the pulsator is located at the extended end of the common combined air and milk tube and is arranged to alternate the pressure pulsations as between different teat cups of the group. Said pulsator comprises a double-ended cylinder, a co-operating double-ended piston and a piston-actuated valve for controlling the alternative connection of the end of said cylinder to the atmosphere and to partial vacuum, and also for alternately connecting the outer chambers of the teat cups to the atmosphere and to partial vacuum. As its major feature, this invention provides an improved pulsator valve and improved piston-actuated means for operating the same.

In the accompanying drawings, which illustrate the invention, like characters indicate like parts throughout the several views.

Referring to the drawings:

Fig. 1 is a vertical axial section of the pulsator and the connected coupling tube;

Fig. 2 is a transverse vertical section on the line 2—2 of Fig. 1, showing also one of the teat cups and its connections;

Fig. 3 is a plan view showing the coupling tube disconnected from the pulsator;

Fig. 4 shows the parts illustrated in Fig. 1, partly in end elevation but with some parts sectioned on the line 4—4 of Fig. 1;

Fig. 5 is a fragmentary side elevation showing the central portion of the pulsator cylinder; and Fig. 6 is a perspective with some parts sectioned, showing the double-ended piston and the pulsator-controlling valve removed from the pulsator-cylinder.

The numeral 7 indicates a flexible tube that extends from the milk pail or receptacle, not shown, and, as in my prior application, constitutes a combined milk and air tube. The extended end of this tube 7 is connected to the receiving end of a coupling tube 8, the opposite end of which, as shown, is closed by a screw-threaded plug 9. At its intermediate portion, this coupling tube 8 is formed with a quite large chamber 10 that constitutes an equalizing chamber and the annular upwardly projecting flange of which is adapted to be tightly seated against a bearing surface 11 and telescoped around a depending annular flange 12 on the under side of the central portion of a pulsator cylinder 13, the ends of which latter are closed by detachable heads 14.

In Fig. 2 is shown a teat cup of the character disclosed in my prior Patent #1,201,808, of date October 17, 1916, and which teat cups are of the double-chambered type, but provided with collapsible and expansible elastic inner tubes 15 that form axial inner teat chambers 16 and annular surrounding air chambers 17 within the outer shells 18.

The coupling tube 8 is provided with four projecting milk tube nipples 19 located in upwardly diverging pairs, one pair on each side of the equalizing chamber 10. These four nipples 19 are connected independently, by branch milk tubes 20, each to the inner chamber 16 of a co-operating teat cup.

The pulsator cylinder 13, at its under portion, is made thick and formed with longitudinally extended air conduits 21 that terminate in inner end ports 22 and outer end ports 23. The inner end ports 22 are located on opposite sides of a central or suction port 24 and quite close thereto, while the ports 23 are located not far from the ends of the cylinder and are adapted to be opened and closed to any desired extent by choke valves 25 of the needle valve type. The central or suction port 24, as shown, is formed in the upper end of a depending clamping post or rod 26, the upper end of which, as shown, is screwed into the bottom of the cylinder and the lower end of which is extended through a perforation in the bottom of the coupling tube 8 and is provided with a thumb nut 27. The lower extremity of the port 24, thus formed in the upper end of said post 26, opens laterally into a small air chamber 28 formed in the bottom of the cylinder surface 11.

The numeral 29 indicates a sleeve that is shrunk onto or otherwise rigidly secured onto the coupling post 26 and has a flanged upper end. The numeral 30 indicates a fixed metal disk or diaphragm, the hub of which closely fits around the sleeve 29 and the outer edge of which is pressed against the depending flange 12 of the cylinder casting. The numeral 31 indicates a compressible and flexible rubber collar that surrounds the post 26 and a portion of the sleeve 29 and, at its lower end, is seated against the bottom of the equalizing chamber 10. The numeral 31 indicates a washer that surrounds the sleeve 29 and, by the expansion of the compressed rubber collar 31$^a$, is held against the hub of the diaphragm 30 and keeps the latter tightly seated against the flange 12. This diaphragm has a plurality of air passages 32. The numeral 33 indicates a washer-like valve that slides freely on the sleeve 29 and is normally gravity-held in the position shown in the drawings, resting on the hub of the diaphragm 30 above its perforations 32 and below the lower extremity of the air chamber 28.

Under the normal operation of the milking apparatus, the valve 33 remains in the post just above noted and does not function, but if there should be a sudden rush of air upward through the air passages 32, such, for example, as caused by sudden removal of one of the teat cups from operative position, said valve will be automatically forced upward, thereby closing the air chamber 28 and preventing milk from being blown or drawn into the cylinder of the pulsator.

The numeral 34 indicates a hanger rod, which, at one end, is hinged to a collar 35 mounted to freely slide on the reduced portion of the coupling tube 8. At its other end, said hanger rod is formed with an eye loosely engaging a channel formed in the thumb nut 27. This so-called hanger rod 34 adapts the pulsator and connected parts to be readily hung up on a hook when out of use and also prevents the nut 27 from being misplaced. When the tube 7 is detached from the tube 8, and the nut 27 is unscrewed from the post 31, the collar 35, together with said rod 34 and nut 27, may be entirely removed from the device.

The pulsator cylinder 13, at its under side, is provided with four air tube nipples 36 projecting from opposite sides thereof and located in pairs on opposite sides of the central group of ports 22 and 24. These air tube nipples 36 are connected, two to the right-hand air conduit 21 and two to the left-hand conduit 21, and each is connected by a flexible air tube 37 to an air tube nipple 38 that communicates with the outer annular air chamber 17 of the co-operating or corresponding teat cup of the group.

We are now to consider the most important feature of this invention, to wit: the piston-actuated pulsator valve mechanism.

Working within the pulsator cylinder 13 is a double-ended piston, the heads 39 of which are connected by an axial piston stem 40; and loosely surrounding this stem 40 is an annular valve 41 that closely fits the cylinder 13. This valve 41, at its under side, has a port 42, which, under oscillatory movements of said valve, will alternately connect the central air port 24 first to the right-hand port 22 and then to the left-hand port 22. The central portion of the cylinder 13 is constantly subject to atmospheric pressure and said valve 41 is so formed that it will connect the left-hand port 22 to the atmosphere when the port 42 connects the right-hand port 22 to the central or suction port 24 and, conversely, will connect the right-hand port 22 to the atmosphere when said port 42 connects the left-hand port 22 to said central or suction port 24.

As an important feature, the interior surface of the annular valve 41 is made reversely conical, flaring axially in opposite directions from its center, as best shown in Figs. 1 and 6, and outward of said conical portion, the interior of said valve is formed cylindrical, the said cylindrical outer end portions being preferably externally reduced in diameter so as to shorten up the valve-acting exterior surface of said valve.

To hold said valve 41 against rotation and to limit its oscillatory movements, it is shown as provided with diametrically opposite stops in the form of stub screws 42 that work in longitudinal slots 43 in the opposite sides of the cylinder 13. Here it should be noted that said slots 42 are of such longitudinal extent that they are never entirely closed by the valve 41 and, hence, the central portion of the cylinder 13 always subject to atmospheric pressure. The cylinder heads 39 are shown as provided with axially projecting stops in the form of long headed screws 44 that are engageable with the cylinder heads 14 to prevent the piston heads 39 from moving far enough to close either of the ports 23.

At its central portion, the valve stem 40 is formed with diametrically projecting bosses 45 and with an axial passage connecting the same, and in these bosses are mounted ball-carrying plungers 46 between which is compressed a coil spring 47. The plungers 46 are formed with pockets that carry hardened balls 48 that work against the reversely flaring conical interior surface of the valve 41.

*Operation.*

The operation of the mechanism above described, briefly summarized, is as follows:

The combined milk and air tube 7 will be connected to a closed milk pail or receptacle in which substantially constant partial vacuum is maintained and this, of course, will maintain an approximately constant partial vacuum or suction in said tube 7, in the coupling 8, in the equalizing chamber 10, in the branch milk tubes 20 and in the inner chambers 16 of all of the four teat cups of the group. In the position of the parts shown in Fig. 1, the valve 41 is in its extreme position toward the right and the double-ended piston is in its extreme position toward the left but ready to begin its reciprocation toward the right. At such time, it will be noted that the left-hand end of the cylinder 13 is open to the atmosphere through the left-hand port 23, left-hand conduit 21, left-hand port 22, the central portion of the cylinder 13 and the slots 43 in the sides of said cylinder; and, at the same time, the right-hand end of said cylinder is subject to suction or partial vacuum, being then connected to the coupling tube 8 through the right-hand port 23, right-hand conduit 21, right-hand port 22, central or suction port 24, air chamber 28 and equalizing chamber 10. Under these conditions, as is evident, the piston will be given its movement toward the right in respect to Fig. 1. When said piston moves toward the right, the balls 48, moving on the conical interior of the valve 41 toward the contracted central portion thereof, will compress the spring 47 until said balls have moved beyond the central maximum contraction of said valve, whereupon said spring 47, acting through said balls and on the right-hand converging portion of the interior cam surface of said valve, will cause said valve to move toward the left. This movement of said valve 41 toward the left will begin before the piston has reached its extreme position toward the right, and said valve will complete its movement toward the left approximately coincident with the completion of said movement toward the right. However, if the piston should move more freely than the valve, its right-hand stop 44, by engagement with the right-hand cylinder head 14, will positively stop said piston at its proper extreme position toward the right and said piston will then become a fixed base of reaction, against which the spring 47 and the cam-acting elements will react to insure the completion of the movement of the valve 41 toward the left. The above noted movement of the valve 41 toward the left just reverses the conditions illustrated in Fig. 1, that is, it causes said valve to connect the right-hand end of the cylinder 13 to the atmosphere and connects the left-hand end of said cylinder to suction or partial vacuum.

When the parts are in the position shown in Fig. 1 and the left-hand end of the cylinder is connected to the atmosphere while the right-hand end of said cylinder is subjected to suction or partial vacuum, the right-hand air nipples 36 and, hence, the outer air chambers 17 of the two teat cups of the group will also be subject to suction or partial vacuum, so that the flexible tubes 15 of said two teat cups will then be expanded, but, at the same time, the two left-hand air nipples 36 and the outer air chambers 17 of the other two teat cups will be connected to the atmosphere and subject substantially to atmospheric pressure, so that the elastic tubes 15 of these two last noted teat cups will then be contracted. Of course, when the valve 41 is moved toward the left, as above described, exactly the reverse conditions in the two pairs of teat cups of the group will be produced, and thus the pulsator, in the arrangement described, not only produces the pressure pulsations in the teat cups of the group, but alternates these pressure pulsations in the two pairs of teat cups of the group. Hence, it will be seen that the valve and valve-actuating mechanism described are especially adaptable for the production of alternated pressure pulsations in different teat cups of a group, but it will be understood that many of the same features of construction may be utilized more generally and, hence, is not limited to the preferred arrangement described.

It will be understood that air drawn from the atmosphere alternately into the opposite ends of the cylinder will be drawn therefrom alternately through the central or suction port 24 through the equalizing chamber 10 and into the coupling tube 8, where it will be commingled with the milk and, with the milk, will be drawn through the combined milk and air tube 7 into the milk pail or into the closed milk pail or receptacle. The desired partial vacuum in said milk pail or receptacle will, by the usual or any suitable way, be maintained in the closed milk pail or receptacle by continuously drawing air therefrom in a manner very well understood by all persons familiar with this subject. The equalizing chamber 10 reduces substantially to nil the effect that would otherwise be present, tending to produce slight pulsations of pressure in the coupling tube 8 and, hence, insures substantially constant suction in said coupling tube and in the combined milk and air tube 7. As a feature of this invention, said equalizing chamber is located directly in the coupling tube element or structure immediately adjacent to its port connections with the cylinder; and this not only simplifies the construction, but increases the effectiveness of said equalizing chamber and, moreover, permits a relatively small equalizing chamber to act with as much efficiency as a larger equalizing chamber located elsewhere.

The preferred way of providing the annular valve 41 with reversely flaring internal cam surfaces for co-operation with yieldingly expanded cam-engaging devices on the piston is to provide said valve with reversely flaring internal cam surfaces, as illustrated, but obviously, such reversely flaring cam surfaces may be otherwise arranged. In actual practice, the valve, cam surface, piston and expansible cam-engaging device on the piston, illustrated in the drawings and above described, have been found highly efficient for the purposes had in view and, moreover, such construction may be commercially produced at comparatively small cost and is very durable.

What I claim is:

1. A pulsator mechanism for milking machines comprising a cylinder, a piston and a valve working in said cylinder, said valve and cylinder having cooperating ports operative to control reverse movements of said piston, said valve having reversely beveled internal cam surfaces, cam-engaging elements operative on the reversely beveled cam surfaces of said valve, and a compression spring set under tension and exerting radially outward pressure on said cam-engaging elements and causing the same to reciprocate said valve in directions reverse to the direction in which said piston is moving or has just been moved.

2. A pulsator mechanism for milking machines comprising a cylinder, a double-headed piston including a stem connecting its heads, an annular valve surrounding the piston stem and working in said cylinder, said valve having internal reversely beveled cam surfaces, said valve and cylinder having co-operating ports operative to control the reverse movements of said piston, cam-engaging elements mounted in the intermediate portion of the piston stem and movable radially outward, and a coiled spring compressed between said cam-engaging elements and forcing the same radially outward and causing the same in cooperation with said reversely beveled cam surfaces to reciprocate said valve in directions reverse to the direction in which said piston is moving or has just been moved.

3. The structure defined in claim 1 in which said cylinder and piston have cooperating stop elements limiting the movements of said piston in positions in which the pistons are spaced from the cylinder heads far enough to leave open certain of the cylinder ports.

4. The structure defined in claim 1 in combination with teat cups connected to certain of the cylinder ports, said cylinder and valve ports being arranged to alternate the pulsations in different groups of teat cups.

In testimony whereof I affix my signature.

LAURITS DINESEN.